United States Patent
Chen et al.

(10) Patent No.: US 6,751,481 B2
(45) Date of Patent: Jun. 15, 2004

(54) DIALING METHOD FOR EFFECTING INTERNATIONAL CALL IN INTELLIGENT CELLULAR PHONE

(75) Inventors: Kun-Huei Chen, Taipei Hsieng (TW); Yung-Feng Wang, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 421 days.

(21) Appl. No.: 09/912,512

(22) Filed: Jul. 26, 2001

(65) Prior Publication Data

US 2003/0022697 A1 Jan. 30, 2003

(51) Int. Cl.$^7$ ............................. H04B 1/38; H04M 1/00

(52) U.S. Cl. ..................... 455/564; 455/450.1

(58) Field of Search .................. 455/432.1, 552.1, 455/564, 550.1, 456.1, 456.6, 418, 412.1, 412.2, 414

(56) References Cited

U.S. PATENT DOCUMENTS

| | | | | | |
|---|---|---|---|---|---|
| 5,305,372 | A | * | 4/1994 | Tomiyori | 455/564 |
| 5,797,089 | A | * | 8/1998 | Nguyen | 455/403 |
| 6,289,226 | B1 | * | 9/2001 | Lekven et al. | 455/566 |
| 6,400,945 | B1 | * | 6/2002 | Jensen et al. | 455/431 |
| 2002/0137499 | A1 | * | 9/2002 | Lai et al. | 455/418 |

* cited by examiner

Primary Examiner—Cong Van Tran
(74) Attorney, Agent, or Firm—Bacon & Thomas, PLLC

(57) ABSTRACT

A dialing method for effecting international call in intelligent cellular phone utilizes a conversion table for storing system codes of a plurality of network companies worldwide and their international access codes and a phone book for storing a plurality of telephone numbers having international access codes respectively of different called parties in the database thereof to let the cellular phone be able to determine current location area while calling in international roaming and find the correct international access code from conversion table in accordance with system code received from an approximate network company for replacing international access code in telephone number searched from phone book.

4 Claims, 2 Drawing Sheets

DIALING METHOD FOR EFFECTING INTERNATIONAL CALL IN INTELLIGENT CELLULAR PHONE

FIELD OF THE INVENTION

The present invention relates to cellular phones and more particularly to a dialing method for effecting international calls in an intelligent cellular phone.

Cellular phones have been popular worldwide in recent years due to their portability, versatility, and inexpensive unit prices, as a communication device for social or business purpose. Further, as compared to conventional wire telephones, cellular phones have advantages in certain fields such as convenience in an outdoor environment and portability. However, the functionalities of cellular phones have not been perfect. For example, a telephone number stored in a phone book of a cellular phone is not available if the international access code of a location area in which a phone call is made is different from that preset in the phone book by the user. In the example of international roaming, a successful cellular phone call is made possible only after a user knows the international access code, national code, area code and numbers of a telephone of a called party in advance i.e., the user has to dial the international access code, national code, area code and numbers sequentially. In view of the above, the international call made by cellular phone is not convenient. In another case of making conversations with several people located in different countries, the searching process for corresponding international access codes and operation thereof are even more complex and time consuming. This really bothers cellular phone users, thus causing inconvenience. Hence, there is a need to solve the above problems associated with international calls made by cellular phones. Moreover, it is desirable to provide a novel cellular phone which can perform a dialing method for effecting international calls in a convenient effective manner in order to overcome the above drawbacks of the prior art.

SUMMARY OF THE INVENTION

It is therefore an object of the present invention to provide a dialing method for effecting an international call in an intelligent cellular phone comprising the steps of storing system codes of a plurality of network companies worldwide and their international access codes in a conversion table in a database of a memory of the cellular phone, and storing a plurality of telephone numbers of different called parties in a phone book in the database; searching for a telephone number stored in the phone book according to the name of a called party to be dialed; determining whether a system code received from a telephone company in the location area of calling this telephone number is different from the system code stored in the phone book; If different, accessing a revision table and searching for the international access code corresponding to the system code in the telephone number retrieved from the phone book by the international access code retrieved from the revision table in accordance with the system code received from the local telephone company in the calling location area; and automatically dialing the telephone number having a correct international access code. This is a convenient and practical design.

DETAILED DESCRIPTION OF THE PREFERRED EMBODIMENTS

The invention is directed to a dialing method for effecting an international call in an intelligent cellular phone or personal digital assistant (PDA) having a cellular phone functionality. The intelligent cellular phone comprises a conversion table in a database in memory 11 for storing system codes and international access codes provided by many international telephone companies and a telephone book in the database containing a plurality of telephone numbers (including international access codes, national codes, area codes and numbers) with respect to different called parties. As the cellular phone is used by a user, a central processing unit (CPU) 13 thereof determines whether a phone book mode is activated. If not, CPU 13 receives an input telephone number and sends it out directly. If phone book mode is activated, CPU 13 searches for a telephone number of a called party going to be dialed in accordance with the name being selected by a user from the phone book. Then, CPU 13 determines whether a system code received from a proximate or local telephone company in the location area in which the call is being made is different from the system code stored in the phone book when storing the telephone number being called. If same, CPU 13 shows the telephone number retrieved from the phone book on display 15 of the cellular phone and sends it out. If the system code received from the local telephone company is different from the one stored in the phone book, CPU 13 may access a revision table in memory 11 searching for international access codes associated with the system code of the local telephone company, and replace the international access code in the telephone number searched from the phone book by an international access code retrieved from the revision table in accordance with the system code received from the local telephone company. Then, a telephone number having a correct international access code is shown on display 15 of the cellular phone. In brief, a cellular phone user may select a desired telephone number to be dialed from the phone book. Then the system of the invention can automatically insert a correct international access code into the telephone number retrieved from the phone book corresponding to the system code received from the local telephone company before dialing it out. This is a convenient and practical design.

Figure 1:
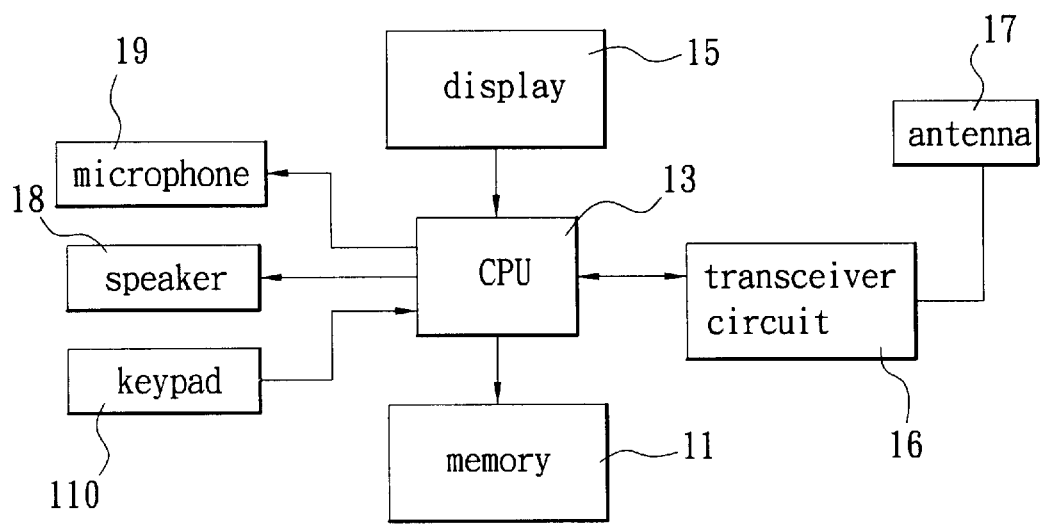
FIG. 1 is a block diagram of electronic elements of an intelligent cellular phone for effecting international call according to the invention.

FIG. 1 is a block diagram of electronic elements of an intelligent cellular phone for effecting an international call according to the invention. CPU 13 of the cellular phone may establish a connection with a base station through transceiver circuit 16 and antenna 17. Hence, CPU 13 may receive telephone signals from the base station. The received signals are converted into sound waves prior to amplifying the same through speaker 18. Also, sound waves from microphone 19 are received by CPU 13. The received sound waves are converted into telephone signals in CPU 13 prior to transmitting to the base station through transceiver circuit 16 and antenna 17. Moreover, CPU 13 may send processed data to display 15 for showing and memory 11 for storing. In addition, CPU 13 may access data stored in memory 11. Additionally, CPU 13 may receive alphanumeric data input from keypad 110 by a user.

Figure 2:
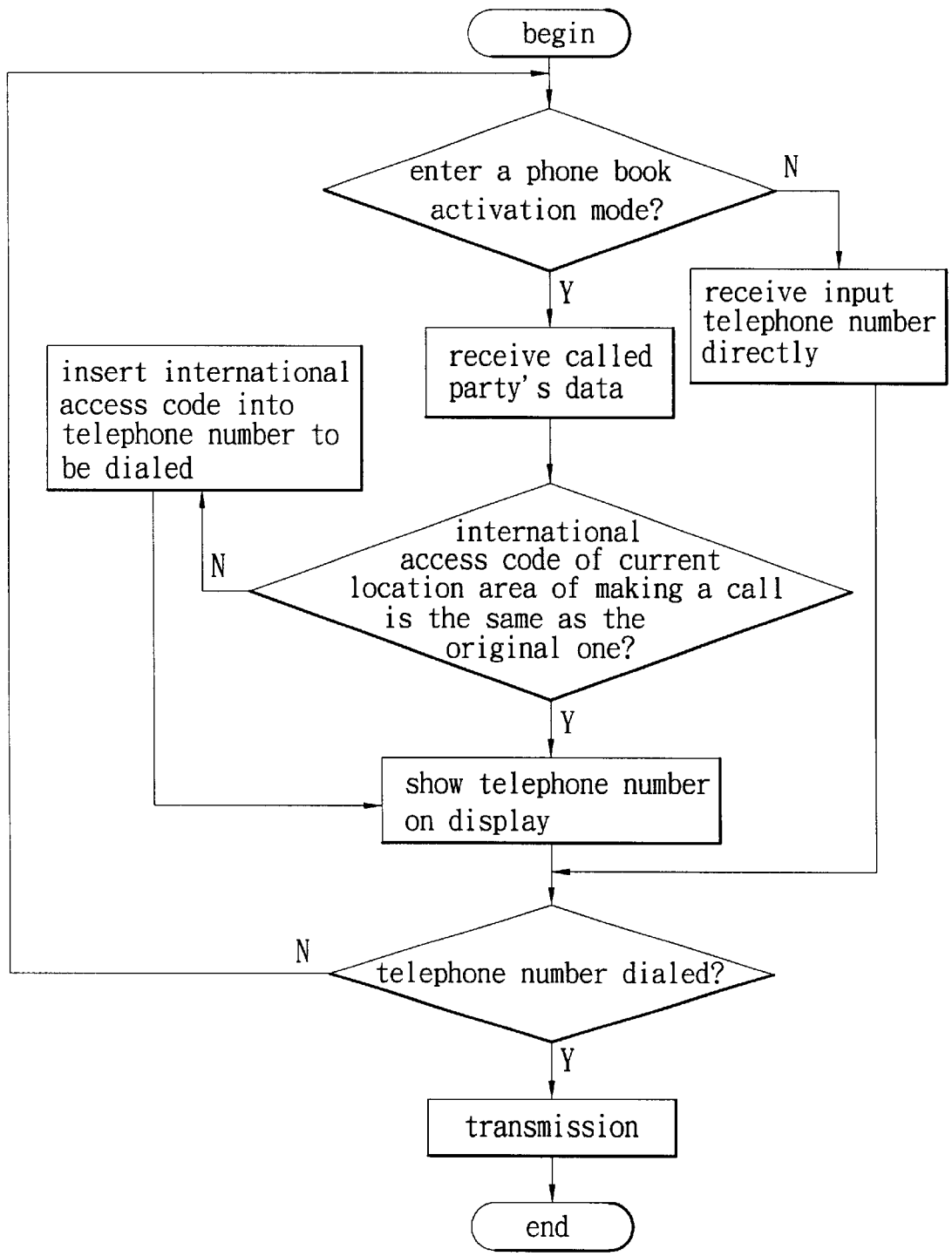
FIG. 2 is a flow chart of a dialing method for effecting such international call.

FIG. 2 is a flow chart of a dialing process for effecting the above international call by CPU 13 of a cellular phone when the cellular phone enters into a waiting state while calling in an international roaming. In step 1, the process determines whether the cellular phone enters into a phone book activation mode. If not, the process receives the input telephone number directly prior to going to step 5. If yes, the process receives the called party's data such as name and retrieves the associated telephone number from the phone book (step 2). In step 3, the process searches for the system code transmitted by a proximate or local base station of a network company prior to establishing a connection therewith. Then the cellular phone accesses the revision table in memory 11 and searches for an international access code corresponding to the system code received from the local base station prior to determining whether the international access code of the location area of dialing this telephone number is the same as the one stored when storing the telephone number. If yes, the process goes to step 4. If not, the process replaces the international access code in the telephone number to be dialed by an international access code retrieved from the revision table prior to going to step 4. In step 4, the process shows the telephone number having a correct international access code to be dialed on display 15 of the cellular phone. Then in step 5, the process determines whether the telephone number is dialed. If not, the process returns to step 1.

In brief, when a cellular phone user has entered into a phone book activation mode and a desired telephone number to be dialed has been selected from the phone book, CPU 13 may access a revision table in memory 11 and search for a correct international access code corresponding to a system code received from a network company in the location area of making this phone call. The telephone number having a correct international access code is automatically dialed out accordingly. This is a convenient and practical design. By utilizing this method, problems associated with the prior art such as inconvenience in making conversations with several people located in different countries, and the complex and time consuming searching process for corresponding international access codes and operation thereof, etc. are substantially eliminated.

Moreover, database of cellular phone is updated regularly. Further, such cellular phone may be implemented as a personal digital assistant (PDA) having a cellular phone functionality.

While the invention has been described by means of specific embodiments, numerous modifications and variations could be made thereto by those skilled in the art without departing from the scope and spirit of the invention set forth in the claims.

What is claimed is:

1. A dialing method for effecting an international call in an intelligent cellular phone including a conversion table for storing system codes of a plurality of network companies worldwide and their international access codes, and a phone book for storing a plurality of called parties' names and telephone numbers having international access codes respectively in a database thereof, comprising the steps of:

determining whether a cellular phone user has entered into a phone book activation mode and a telephone number to be dialed has been selected from the phone book;

searching for a system code transmitted by a base station proximate the location from which the call is being made in order to let said cellular phone recognize a current location area in accordance with the system code transmitted by said base station;

comparing the system code transmitted by the base station with a system code retrieved from said phone book and, if different, replacing an international access code of said telephone number selected from the phone book with a corresponding international access code retrieved from said conversion table.

2. The method of claim 1, wherein said cellular phone receives an input telephone number and dials it out directly when said cellular phone has not entered into a phone book activation mode.

3. The method of claim 1, wherein said cellular phone shows a telephone number having said international access code retrieved from said conversion table on a display of the cellular phone before dialing.

4. The method of claim 1, wherein said cellular phone is a personal digital assistant (PDA) having a cellular phone functionality.

\* \* \* \* \*